STABILIZED TIMING NETWORK

Filed July 6, 1962 2 Sheets-Sheet 1

INVENTOR
T. A. SCHMADER
BY Patrick J. Roche
ATTORNEY

Sept. 21, 1965 T. A. SCHMADER 3,207,926

STABILIZED TIMING NETWORK

Filed July 6, 1962 2 Sheets-Sheet 2

INVENTOR
T. A. SCHMADER
BY Patrick J. Roche
ATTORNEY

United States Patent Office 3,207,926
Patented Sept. 21, 1965

3,207,926
STABILIZED TIMING NETWORK

Thomas A. Schmader, Reynoldsburg, Ohio, assignor to Bell Telephone Laboratories, Incorporated, New York, N.Y., a corporation of New York Filed July 6, 1962, Ser. No. 207,974
4 Claims. (Cl. 307—88.5)

This invention relates to a discharge-controlled timing network, and more specifically to the stabilization of such a network.

In a discharge-controlled timing network, a timing interval is represented by the time duration over which the energy stored by a storage device, either an inductor or a capacitor, discharges from an initial level to a cutoff level. When the timing interval is established with precision, the timing network is said to be stabilized. Then the interval can be used to govern the occurrence of an event, or to verify that the event has taken place according to schedule.

The precision of timing is affected by fluctuations in the amplitude of the source energy used to charge the storage device. In other words, when the amplitude of the source energy changes, the storage device charges to a different level than that upon which the timing interval is based. In addition, the precision of timing is affected by the rate at which the discharge takes place. When the rate is high the instant of cutoff can be determined with greater accuracy than when the rate is low.

Typically, timing network stabilization, with its attendant precison of timing, has required either an energy source of critical rating—in the sense of an appreciable amplitude of substantial constancy—or, as exemplified in Patent No. 2,976,487, issued to E. Cohen on March 21, 1961, two sources of moderate rating.

The present invention contemplates a discharge controlled timing network in which stabilization is achieved with a single energy source of moderate rating.

It is a principal object of the invention to provide an improved discharge-controlled timing network.

It is another object of the invention to provide a discharge-controlled timing network which is independent of variations in the amplitude of source energy charging the storage device before the start of each timing interval.

In accomplishing the foregoing and related objects, the invention provides for energizing and de-energizing a storage device from a single source. To prepare for a timing operation, the storage device is energized by the source in one direction of conduction through a unidirectionally conductive device. When the storage device is switched to render the unidirectionally conductive device nonconductive, marking the commencement of timing, the storage device is de-energized through the source in its opposite direction of conduction. Timing ends when the storage device is sufficiently de-energized that the nonconductive condition of the unidirectionally conductive device can no longer be maintained. Because the storage device is energized and de-energized from and through the same source, the timing interval is independent of long-term source fluctuations, and the signal differential across the storage device is the same as that provided by two sources.

More specifically, in one aspect of the invention, when the storage device is a capacitor and the unidirectionally conductive device is formed by opposite conductivity regions of either a diode or a transistor, a voltage source readies the capacitor for a timing operation by charging it in one direction of conduction through the diode or transistor. At the commencement of timing, the diode or transistor is back-biased and rendered nonconducting by the closure of a switch which connects the capacitor across the diode or transistor and allows the capacitor to be discharged through the voltage source. Timing ends when the capacitor is discharged to the extent that the diode or transistor can no longer remain in its back-biased condition.

Additional aspects of the invention will become apparent after considering several of its illustrative embodiments taken in conjunction with the drawings, in which.

Figure 1:
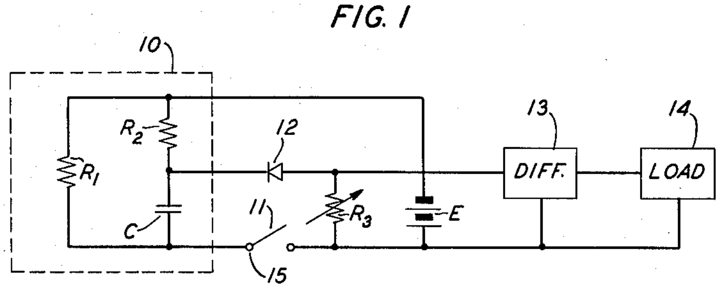
FIG. 1 is a schematic diagram of a specific embodiment of the invention.

In the overall timing network of FIG. 1, a charging circuit 10 is employed in conjunction with a timing switch 11, a unidirectionally conductive diode 12 and a source of voltage E. The charging circuit is constituted of a resistor $R_1$ in shunt with the series combination of a resistor $R_2$ and a capacitor C. Interposed between the diode 12 and the switch 11 is a biasing resistor $R_3$, along with the shunt combination of a differentiator 13 and a load 14.

Before a timing interval is to commence, the switch is in its normally open position. As a result, charging current from the source flows through the biasing resistor $R_3$, the diode and the shunt resistor $R_1$ until the capacitor is charged, to a peak voltage level P, measured with respect to the pivot point 15 of the switch, as shown in FIG. 2A.

To initiate timing, the switch is closed, causing the stored charge on the capacitor to render the diode nonconductive by back-biasing it. In addition, closure of the switch reverses, relative to the source, the polarity of the pre-existing charge stored on the capacitor. Because of the back-biasing, the capacitor cannot discharge through the diode. But discharge current can flow to the capacitor from the source through the switch and the series resistor $R_2$. Consequently, at the instant $t_1$, marking the start of a timing interval T, the capacitor begins to discharge according to the exponential decay curve *a* in FIG. 2A.

Figure 2A:
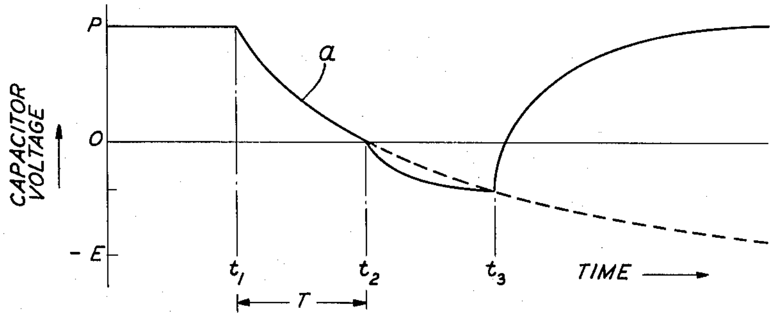
FIGS. 2A, 2B and 2C are waveforms illustrating the operation of the embodiment in FIG. 1.

If the diode were to remain back-biased, the decay wave *a* would continue to apply, and the capacitor, once discharged, would charge toward the negative level $-E$ of the source according to the dashed-line portion of the decay curve (FIG. 2A). However, at the instant $t_2$, when the voltage measured across the capacitor is near zero, the back-bias condition of the diode cannot be maintained and the diode once again becomes conductive, causing a discontinuity in the decay curve and marking the end of the timing interval T.

Figure 2B:
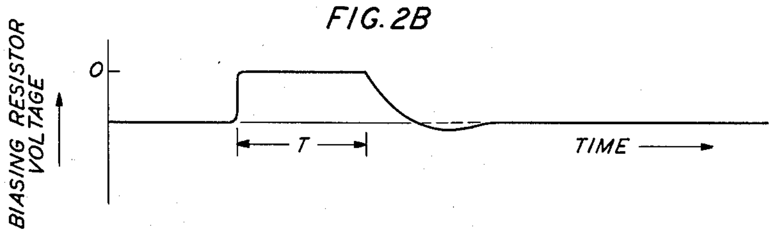
Figure 2C:
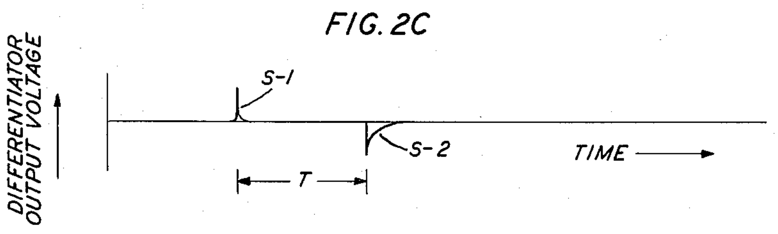

The changes which have taken place in the voltage level of the capacitor are reflected by changes in signal level measured across the biasing resistor $R_3$, as shown in FIG. 2B. At the instant $t_1$, when the timing switch closes, the voltage across resistor $R_3$ changes from a negative level to substantially zero. This change is indicative of the reverse-bias condition of the diode which marked the start of the timing interval T. Subsequently, when the diode becomes conductive at the instant $t_2$, marking the end of the timing interval T, the voltage developed across the biasing resistor $R_3$ once again becomes negative. Hence, the timing interval T can be precisely indicated by the differentiator which generates a first impulse signal *s*–1 at the initial instant $t_1$ and a second impulse signal *s*–2 at the terminal instant $t_2$ of the timing interval T, as shown in FIG. 2C. At a later instant $t_3$ in FIG. 2A, when the switch is opened to allow recharging of the capacitor to the peak level P in preparation for an ensuing timing cycle, there is little effect upon the output voltage if the resistance of the shunt resistor $R_1$ is large, so that the differentiator does not produce a spurious impulse signal. It will be understood that the ON and OFF times in the load are determined by the impulse signals $s$–1 and $s$–2.

Because the capacitor is both charged from and discharged through the same voltage source, the timing interval T, given in the following equation is independent of long-term variations in the source voltage:

$$T=R_2C\ \ln\left(\frac{2R_2+R_3}{R_2+R_3}\right)$$

where $R_2$ is the resistive magnitude of the series resistor,
$R_3$ is the resistive magnitude of the biasing resistor,
C is the capacitive magnitude of the capacitor, and
ln is the symbol for natural logarithm.

Further, the slope of the discharge curve $a$ in FIG. 2A required to produce sharply defined indications $s$–1 and $s$–2 in FIG. 2C at the commencement and termination, respectively, of the timing interval T is achieved with a source voltage of relatively small magnitude.

Figure 3:
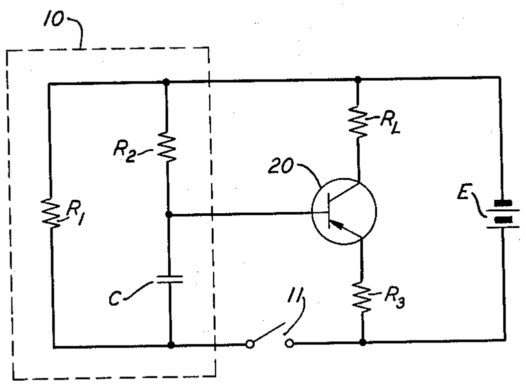
FIG. 3 is a schematic diagram showing a further embodiment of the invention.

A further embodiment of the invention is shown in FIG. 3, in which the base-emitter junction of a transistor 20 replaces the diode 12 of FIG. 1. In addition, a load resistor $R_L$ interconnects the collector of the transistor with the source of voltage E. This load may comprise, for example, the operating winding of a relay, not shown, included in a suitable work circuit.

A timing interval is indicated by the network of FIG. 3 in manner similar to that previously explained for FIG. 1. When the timing switch 11 is open, the transistor is in an "on" condition, and the capacitor C is charged from the source E through the biasing resistor $R_1$, the base-emitter junction of the transistor 20 and the shunt resistor $R_3$. As long as the timing switch remains open, current from the source flows through the load resistor $R_L$ by way of the biasing resistor and the emitter-collector path of the transistor. However, when the switch is closed at the beginning of a timing interval T (FIG. 2A), the stored charge on the capacitor back-biases the base-emitter junction of the transistor, turning the transistor "off" and terminating the current flow through the load resistor $R_L$. After the capacitor has discharged to substantially a zero level, the transistor once again becomes conductive. The accompanying resumption of current flow through the load resistor indicates that the timing interval has terminated at the instant $t_2$.

Figure 4:
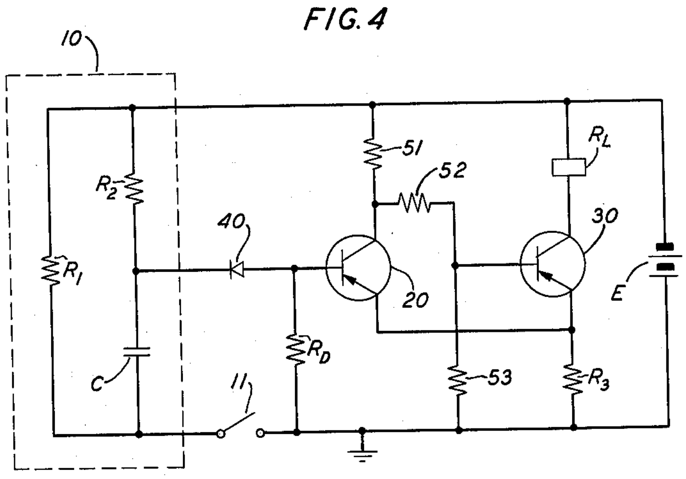
FIG. 4 is a modification of FIG. 3.

In a modification, shown in FIG. 4, of the embodiments of FIGS. 1 and 3, the load $R_L$ is isolated from the transistor 20 of FIG. 3 by using a second transistor 30. The emitters of both transistors are connected in common to the biasing resistor $R_3$, while the collector of the first transistor 20 is tied to the base of the second transistor 30 by a chain of voltage divider resistors 51, 52 and 53 in shunt with the source of voltage E. In addition a diode 40 and an associated resistor $R_D$ are interposed between the charging circuit 10 and the first transistor 20.

When the timing switch 11 of FIG. 4 is open, the first transistor 20 is in an "on" condition, holding the other transistor 30 "off." However, when the timing switch is closed, so that the emitter-base junction of the first transistor is back-biased by the voltage of the charge stored in the capacitor, the first transistor is turned off and the second transistor is caused to conduct at a time similar to the initiating instant $t_1$ in FIG. 2A. The conduction condition of the second transistor energizes the operating winding of a timing relay $R_L$. At the end of the timing interval at the time similar to the terminal instant $t_2$ in FIG. 2A, except that the discontinuity in the discharge curve for the timing network occurs at a negative voltage level, instead of zero, because of the voltage developed across the biasing resistor $R_3$, the first transistor once again becomes conducting. As a result, the second transistor ceases to conduct, so that the timing voltage of the relay $R_L$ is reduced to zero. In FIG. 4 the diode 40 serves to prevent a breakdown, due to the source voltage, of the emitter-base junction in the first transistor 20, while the biasing resistor $R_D$, desirably of relatively large resistive magnitude, develops a voltage level which maintains the emitter-base junction of the first transistor 20 in its reverse bias condition during the timing interval T.

It is to be understood that, while the invention has been described with reference to a junction transistor, other types can be used as well.

It is also to be understood that the foregoing embodiments are merely illustrative. Other modifications and adaptations, including the use of inductors and current sources, will occur to those skilled in the art without departing from the spirit and scope of the invention.

What is claimed is:

1. A timing network which comprises
   a capacitor connected in series with a first resistor, both of which are connected in parallel with a second resistor,
   a switch and a voltage source serially connected in parallel with the serially connected capacitor and first resistor,
   a diode with its cathode connected to a point common to said serially connected capacitor and first resistor and its anode connected to one terminal of a third resistor whose opposite terminal is connected to a point common to said switch and said voltage source,
   a differentiator with one input connected to a point common to the diode anode and said third resistor and another input connected to a point common to said switch, said third resistor, and said voltage source,
   and a load connected to the output of said differentiator.

2. A timing network which comprises
   a capacitor connected in series with a first resistor, both of which are connected in parallel with a second resistor,
   a switch and a voltage source serially connected in parallel with the serially connected capacitor and first resistor,
   a load with one terminal connected to a point common to said second resistor and said voltage source,
   and a transistor with its base connected to a point common to said serially connected capacitor and first resistor, its emitter connected to one terminal of a third resistor whose opposite terminal is connected to a point common to said switch and said voltage source, and its collector connected to the other terminal of said load.

3. A timing network which comprises
   a capacitor connected in series with a first resistor, both of which are connected in parallel with a second resistor,
   a switch and a voltage serially connected in parallel with the serially connected capacitor and first resistor,
   a third resistor with one terminal connected to a mon to said second resistor and said voltage source,
   a first transistor with its base connected to a point common to said serially connected capacitor and first resistor, its emitter connected to one terminal of a fourth resistor whose opposite terminal is connected to a point common to said switch and said voltage source, and its collector connected to the other terminal of said third resistor,
   fifth and sixth resistors serially connected between a point common to the collector of said first transistor and said third resistor and said point common to said switch and said voltage source,
   a load with one terminal connected to said point common to said second resistor and said voltage source, and a second transistor with its base connected to a junction point of said fifth and sixth resistors, its emitter connected to a point common to the emitter of said first transistor and said fourth resistor, and its collector connected to the other terminal of said load.

4. The timing circuit according to claim 4 which includes a diode connected between said first transistor base and said point common to said first resistor and capacitor, said diode poled for conduction in the direction from said last-mentioned transistor base toward said last-mentioned common point, and a seventh resistor having one terminal connected to a point common to said diode and said first transistor base and having another terminal connected to the point common to said switch and voltage source.

References Cited by the Examiner

UNITED STATES PATENTS

| | | | |
|---|---|---|---|
| 2,803,814 | 8/57 | Bloser | 328—129 |
| 2,950,422 | 8/60 | Purkhiser | 317—142 |
| 2,972,112 | 2/61 | Langan | 328—72 |
| 2,995,668 | 8/61 | Sharaf | 307—88.5 |
| 3,034,024 | 5/62 | Mierendorf et al. | 307—88.5 |
| 3,158,790 | 11/64 | Garret | 328—131 |
| 3,165,648 | 1/65 | Sainsbury | 307—88.5 |

OTHER REFERENCES

"Electronics," Sept. 25, 1959. "Transistor Time Delay for Industrial Control," by Symauz and Bakes, pages 74 and 75.

JOHN W. HUCKERT, *Primary Examiner.*

ARTHUR GAUSS, *Examiner.*